United States Patent
Park et al.

(10) Patent No.: US 6,828,063 B2
(45) Date of Patent: *Dec. 7, 2004

(54) ANODE THIN FILM FOR LITHIUM SECONDARY BATTERY

(75) Inventors: Young-sin Park, Kyungki-do (KR); Hong-koo Baik, Seoul (KR); Sung-man Lee, Kangwon-do (KR); Joo-yeal Oh, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 155 days.

This patent is subject to a terminal disclaimer.

(21) Appl. No.: 09/987,939

(22) Filed: Nov. 16, 2001

(65) Prior Publication Data

US 2002/0048705 A1 Apr. 25, 2002

(30) Foreign Application Priority Data

Nov. 18, 2000 (KR) .......................................... 2000-68728
Aug. 28, 2001 (KR) .......................................... 2001-52112

(51) Int. Cl.$^7$ .............................. H01M 4/40; H01M 4/38
(52) U.S. Cl. ................ 429/219; 429/231.95; 429/218.1
(58) Field of Search .............................. 429/218.1, 219, 429/231.95, 231.9

(56) References Cited

U.S. PATENT DOCUMENTS

| | | | | |
|---|---|---|---|---|
| 5,498,495 A | * | 3/1996 | Takada et al. | ............... 429/219 |
| 6,051,340 A | * | 4/2000 | Kawakami et al. | .... 429/231.95 |
| 6,235,427 B1 | * | 5/2001 | Idota et al. | ............... 429/218.1 |

FOREIGN PATENT DOCUMENTS

| | | |
|---|---|---|
| EP | 0668621 A | 8/1995 |
| EP | 0690517 A | 1/1996 |
| EP | 0872902 A | 10/1998 |
| JP | 07022017 A | 1/1995 |
| JP | A-10-284130 | 10/1998 |
| JP | A-2000-3727 | 1/2000 |

* cited by examiner

Primary Examiner—Carol Chaney
(74) Attorney, Agent, or Firm—Burns, Doane, Swecker & Mathis, L.L.P.

(57) ABSTRACT

The present invention provides an anode thin film for a lithium secondary battery having a current collector and an anode active material layer formed thereon. Here, the anode active material layer is a multiple-layer thin film comprising a silicon (Si) layer and a silver (Ag) layer or a single-layer thin film comprising silicon (Si) and silver (Ag).

8 Claims, 8 Drawing Sheets

ANODE THIN FILM FOR LITHIUM SECONDARY BATTERY

Priority is claimed to Patent Application Numbers 2000-68728 and 2001-52112, filed in the Republic of Korea on Nov. 18, 2000 and Aug. 28, 2001, respectively, both herein incorporated by reference.

BACKGROUND OF THE INVENTION

1. Field of the Invention

The present invention relates to an anode thin film for lithium secondary battery, and more particularly, to an anode thin film for a lithium secondary battery having improved charging/discharging cycle life characteristics by using silicon (Si) and silver (Ag) as materials of forming an anode active material layer formed on a current collector.

2. Description of the Related Art

Recently, according to advanced microelectronics industry and development of miniaturized, highly efficient electronic devices and very small sensor devices, small and thin batteries as power sources for driving such devices are highly demanded.

Figure 1:
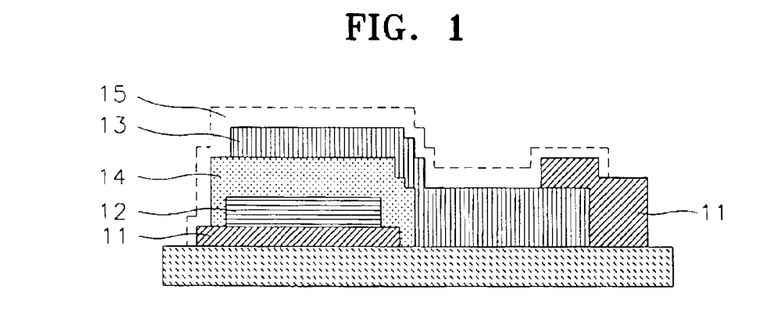
FIG. 1 is a schematic diagram of a conventional thin film battery.

FIG. 1 is a schematic diagram of a conventional thin film battery. Referring to FIG. 1, the thin film battery basically is constructed such that a cathode 12, an electrolyte 14 and an anode 13, each in the form of a thin film, are sequentially stacked on a current collector 11, to have the overall thickness of approximately 10 $\mu$m, characterized by the following advantages. In FIG. 1, reference number 15 denotes a protective layer.

The thin-film stacked structure in which the anode is arranged in the vicinity of the cathode, increases a current density, leading to an excellent efficiency of a battery, and reduces moving distances of ions between the two electrodes, facilitating ionic mobility, by which the content of a reactive material can be greatly reduced. Also, since such thin film batteries can be easily fabricated in an arbitrary shape and size, they are expected to be used as promising main power sources for driving very small electronic device, MEMS (Micro Electro Mechanical System) and very small sensors.

The thin film battery fabricated by the same process as in a semiconductor device can be mounted with an electronic circuit on a semiconductor chip, thereby implementing a CMOS (Complementary Metal Oxide Semiconductor) memory chip using the thin film battery as a back-up power source. Also, an unused space of an electronic device can be minimized, thereby maximizing the space utilization efficiency. Batteries having various voltages and capacities can be realized by serial/parallel connection through appropriate design and etching, leading to a variety of applications.

Research into thin film batteries has hitherto focused on fabrication and evaluation of cathode thin films formed of $V_2O_5$, $LiCoO_2$ or $LiMn_2O_4$, and satisfactory research achievements have been reported. Anode thin films for such batteries are mostly lithium thin films formed by deposition of lithium metal.

Lithium metal having a relatively low melting point of approximately 180° C., is liable to be molten due to heat generated during soldering that is performed in a packaging process, which may cause damages to the device. Also, since lithium metal is highly reactive in the air, many handling difficulties are involved and an additional device for isolating the device from moisture and oxygen is necessary, which makes it difficult for lithium metal to be put into practical use as an electrode material of power source for driving very small electronic devices.

Although the use of anode thin films of silicon-tin oxynitride (SITON), silicon dioxide ($SnO_2$) or nitride as well as the lithium thin films have been attempted, irreversible reactions occurring during initial charging/discharging cycles are not properly controlled.

To overcome the problem of a low charge/discharge efficiency of lithium, research into lithium alloy has been carried out. Much attention is being paid to a metal that can form lithium alloys, such as tin (Sn), silicon (Si) or aluminum (Al), as a next generation anode active material. While the anode active material exhibits excellent capacity characteristics with respect to lithium in a low voltage range, a change in volume of the active material due to intercalation/deintercalation of lithium during charging/discharging cycles, causes damages to an anode thin film structure, deteriorating cycle characteristics. In particular, in the thin film battery using a solid electrolyte, adhesion at the interface between an electrode and a current collector is considerably reduced, deteriorating the battery performance. Importantly, it is necessary to develop a material having excellent cycle characteristics without a reduction in capacity due to a irreversible reaction during intercalation or deintercalation of lithium.

SUMMARY OF THE INVENTION

To solve the above-described problems, it is a first object of the present invention to provide an anode thin film for a lithium secondary battery having improved charging/discharging characteristics.

To accomplish the object of the present invention, there is provided an anode thin film for a lithium secondary battery having a current collector and an anode active material layer formed thereon, wherein the anode active material layer is a multiple-layer thin film comprising a silicon (Si) layer and a silver (Ag) layer.

Also, to accomplish the object of the present invention, there is provided an anode thin film for a lithium secondary battery having a current collector and an anode active material layer formed thereon, wherein the anode active material layer is a single-layer thin film comprising silicon (Si) and silver (Ag).

The multiple-layer thin film layer comprises Si/Ag/Si layers, Si/Ag/Si/Ag layers, Si/Ag/Si/Ag/Si/Ag layers, Si/Ag/Si/Ag/Si/Ag/Si/Ag layers or Ag/Si/Ag/Si/Ag/Si/Ag layers.

Also, In the anode thin film of the present invention, the topmost layer of the multiple-layer thin film layer is preferably formed of Ag. The lithium battery employing the anode thin film has a better cycle characteristics.

In the anode thin film of the present invention, the Si layer and the Ag layer are alternately stacked. In particular, the Ag layer is formed between Si layers.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Although silicon has a relatively large capacity with respect to lithium even at a low voltage range so that it can be advantageously used as an anode active material, it cannot properly suppress deterioration of an active material due to a great change in volume occurring during charging and discharging, leading to limited application of silicon as an anode active material. The present invention is characterized in that an anode active material layer is formed using both silicon and silver (Ag) that can be functioned as a medium for lithium ions and electron movement while solving such a drawback of silicon, that is, stress due to volumetric expansion of silicon. Here, since silver does not react with silicon, the capacity and reversibility in a lithium-silicon reaction can be ensured. Also, the structural stability of an active material can be ensured during a subsequent heating step that is required in a packaging process of a thin film battery. In a lithium secondary battery employing such an anode active material layer, various charging/discharging cycle characteristics can be attained through control of the micro structure, crystallinity, size and distribution of each material for silicon and silver layers by thickness of each of silicon (Si) and silver (Ag) layers and sequence of the layers, overall thickness of the anode active material layer, thermal treatment conditions for forming a thin film, a mixture ratio of Ag and Si, and the like.

An anode thin film according to a preferred embodiment of the present invention will now be described in more detail with reference to FIGS. 2A through 2E.

As shown in FIGS. 2A through 2E, the anode thin film according to the present invention includes a current collector and an anode active material provided on the current collector, the anode active material being formed of a multiple-layer thin film in which a Si layer and an Ag layer are stacked.

In the anode thin film according to the present invention, the current collector is not specifically restricted but a copper film is generally used, the copper film being generally 100 to 300 nm in thickness.

Figure 2:
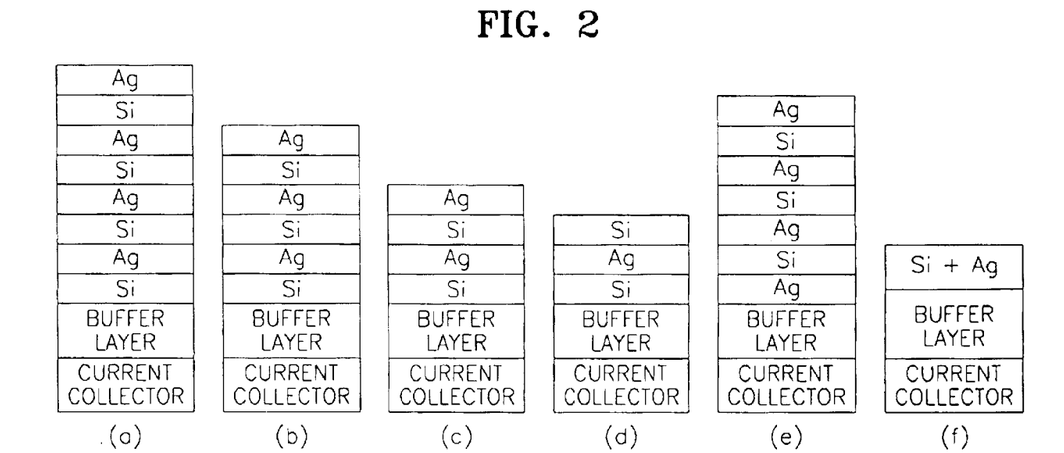
FIG. 2 is a schematic diagram showing the structure of an anode employing a multiple-layer thin film prepared by Example 1 of the present invention.

The anode active material layer shown in FIG. 2A is constructed of Si/Ag/Si/Ag/Si/Ag/Si/Ag layers sequentially stacked. The anode active material layer shown in FIG. 2B is constructed of Si/Ag/Si/Ag/Si/Ag layers sequentially stacked. The anode active material layer shown in FIG. 2C is constructed of Si/Ag/Si/Ag layers sequentially stacked. The anode active material layer shown in FIG. 2D is constructed of Si/Ag/Si layers sequentially stacked. The anode active material layer shown in FIG. 2E is constructed of Ag/Si/Ag/Si/Ag/Si/Ag layers sequentially stacked.

As shown in FIGS. 2A through 2E, the anode active material layer according to the present invention is preferably a multiple-layer structure in which Si layers and Ag layers are alternately stacked. In particular, the volumetric expansion of silicon can be more effectively suppressed by forming an Ag layer between Si layers.

The thickness and number of stacked Si layers are proportional to the amount of the anode active material used. Thus, it is possible to change the thickness and number of stacked Si layers in various types according to device requirement and cathode capacity, preferably 50 to 250 Å. If the thickness of stacked Si layers is less than 50 Å, the number of Si/Ag multiple layers must be increased to meet the capacity as requested in design. An increase in the number of stacked Ag layers exceeding a predetermined range may increase an over-potential of the anode thin film. If the thickness of stacked Si layers is greater than 250 Å, the volumetric expansion of silicon cannot sufficiently suppressed.

On the other hand, silver (Ag) reacts with lithium at a low voltage range of 0.08 V or less to form a stable silver-lithium (Ag—Li) alloy. However, during charging, a lithium-silver (Li—Ag) alloy is slowly decomposed into Li and Ag so that reactant Li cannot completely escape from the alloy, which means lowered reversibility, thereby affecting irreversible capacity. Thus, in order to allow Ag to be served as such, Ag is deposited to a minimum thickness, preferably to a thickness of 10 to 70 Å. If the thickness of Ag is less than 10 Å, the effect of suppressing a volumetric change of Si is negligible. If the thickness of Ag is greater than 70 Å, the rate of decomposition of the Li—Ag alloy into Li and Ag is undesirably reduced.

The Si/Ag multiple-layer thin film stacked on the current collector can form a lithium secondary battery having various performances according to stacking sequence and thickness. If the topmost layer of the multiple-layer thin film is a Si layer, as shown in FIG. 2D, the battery exhibits excellent capacity. If the topmost layer of the multiple-layer thin film is an Ag layer, as shown in FIGS. 2A through C and FIG. 2E, the battery exhibits excellent cycle characteristics, which is because Ag in the topmost layer serves to suppress cracking due to volumetric expansion and shrinkage of Si and loss of a Si active material, at the interface between an electrode and an electrolyte.

Also, in the anode thin film of the present invention, a single layer containing Si and Ag, as shown in FIG. 2F, may be formed, unlike the Si/Ag multiple-layer thin film, as shown in FIGS. 2A through 2E. Here, a buffer layer made of at least one selected from the group consisting of vanadium (V), nickel (Ni), molybdenum (Mo) and copper (Cu) may be further formed between the current collector and the anode active material layer.

In the anode thin film of the present invention, methods of forming a thin film of Si/Ag multiple layers or a single layer containing Si and Ag are not specifically restricted and sputtering, e-beam evaporation and/or ion beam assisted deposition (IBAD) may be used. Here, the processing conditions of each method are not specifically restricted but will now be explained briefly.

According to the sputtering method, a thin film having fine and uniform components and an amorphous or nano-particle structure according to the colling degree of a substrate on which thin films are formed, can be attained. In order to manufacture a thin film having a multiple-component system, a mosaic sputtering method using a mosaic-shaped target, a co-sputtering method using two or more targets or a sputtering method using an alloy target may be employed.

Specifically, according to the co-sputtering method in which separate targets are simultaneously sputtered for deposition, thin films having various compositions can be attained by adjusting radio frequency (rf) power applied to each target. During the co-sputtering method, the same deposition conditions for such as deposition pressure, gas flow rate, gas proportion or the like, are given. Thus, the only parameter is the rf power applied to each target in adjusting the composition of a thin film. Generally, while the power for depositing a basic material, that is, silicon (Si), is maintained at an equal level, the levels of power for depositing additional materials are varied. For example, the deposition power of Si is in the range of 100 to 300 W and the deposition power of Ag is in the range of 0 to 100 W. In the case of the mosaic sputtering method, under the same processing conditions, the parameter in varying the composition of a thin film is the number of chips.

The use of ion beam assisted deposition (IBAD) makes it possible to prepare a multiple-component, amorphous or crystalline thin film by appropriately adjusting ion beam conditions using the mobility and reactivity of atoms which are increased while accelerated electron beams collide with atoms deposited on a substrate. The composition of the thin film can be changed by adjusting the current of ion beams applied to each evaporation source. The crystallinity and micro structure of the deposited thin film can be adjusted by changing the flux and accelerated voltage of Ar ions.

According to the e-beam evaporation method, e-beams are simultaneously focused on different evaporation sources and evaporated to be co-sputtered on a substrate.

The composition of a thin film can be changed by adjusting the flux of e-beam, i.e., e-beam current, applied to each evaporation source. Also, the crystallinity and micro structure of the deposited thin film can be adjusted by changing the accelerated voltage of Ar ions.

In the present invention, Si and Ag are co-sputtered to form a single layer containing Si and Ag. When the single layer is formed in the above-described co-sputtering method, characteristics of a finally obtained anode active material layer may slightly differ according to the distribution, particle size and mixing ratio of silver distributed with silicon. However, the same effect as in the Si/Ag multiple-layer thin film, as shown in FIGS. 2A through 2E, can be attained by controlling micro-particle sized silver to be distributed uniformly among silicon particles. Here, Si and Ag contained in the single layer are preferably mixed in a molar ratio of 7:3 to 3:7. If the content of Ag relative to Si is greater than the above proportion, a large amount of Ag is present around Si that is reactive with Li, so that Si is shielded by Ag, prohibiting lithium from accessing to available silicon atoms, thereby leading to a considerably lower capacity of an electrode than designed. If the content of Ag relative to Si is less than the above proportion, the effect of suppressing a volumetric change of Si is undesirably negligible. The thickness of the single layer can be changed in various manners according to the requirement of a device and the capacity of a cathode. If it is possible to make fine particle-phase Ag be uniformly distributed among Si particles within the above range, the thickness of the single layer can be increased in an appropriate range.

In the anode thin film of the present invention, as shown in FIGS. 2A through 2F, a buffer layer is preferably formed between the current collector and the anode active material layer. The buffer layer is preferably made of at least one selected from the group consisting of vanadium (V), nickel (Ni), molybdenum (Mo) and copper (Cu), and serves to relieve stress between the anode active material layer and the current collector and to ensure the stability of the interface therebetween and the interface between the anode active material layer and the electrolyte. Here, the thickness of the buffer layer is preferably 50 to 250 Å. If the thickness of the buffer layer is less than 50 Å, the buffering effect of the buffer layer, for example, relieved stress between the current collector and the anode active material layer, cannot sufficiently exhibited. If the thickness of the buffer layer is greater than 250 Å, an increase in volume of the anode thin film is undesirably resulted, without a change in electrochemical property of the anode thin film.

The present invention will now be described in more detail through the following examples, but not limited thereto.

EXAMPLE 1

The respective components of each thin film were sequentially deposited on a Cu substrate using 2-inch diameter Si, Ag and V targets, to prepare six anode thin films as listed in Table 1.

At the time of deposition, an initial vacuum state was adjusted to $2 \times 10^{-6}$ torr, a V thin film was deposited to a thickness of 200 Å with an rf power of 50 W under the conditions of argon (Ar) gas being induced to maintain an operating pressure of 5 mTorr and a flux of 10 sccm, and then an Ag thin film and a Si thin film were alternately deposited on the resultant. Here, the Si thin film was deposited to a thickness of 70 to 200 Å with rf power of 200 W, and the Ag thin film was deposited to a thickness of 25 to 50 Å under the conditions of direct-current (dc) 270 V and 30 mA.

TABLE 1

| Sample | Structure of anode active material layers stacked | Thickness of Si layer (Å) | Thickness of Ag layer (Å) |
| --- | --- | --- | --- |
| MSA-1 | Cu/V(200 Å)/Si/Ag/Si/Ag/Si/Ag/Si/Ag | 70 | 25 |
| MSA-2 | Cu/V(200 Å)/Si/Ag/Si/Ag/Si/Ag | 100 | 25 |
| MSA-3 | Cu/V(200 Å)/Ag/Si/Ag/Si/Ag/Si/Ag | 100 | 25 |
| MSA-4 | Cu/V(200 Å)/Si/Ag/Si/Ag | 200 | 25 |
| MSA-5 | Cu/V(200 Å)/Si/Ag/Si | 200 | 25 |
| MSA-6 | Cu/V(200 Å)/Si/Ag/Si/Ag/Si/Ag/Si/Ag | 70 | 50 |

In order to evaluate electrochemical properties of anode thin films manufactured by the above-described procedure, a lithium secondary battery was fabricated using metallic lithium as a counter electrode and a reference electrode and using 1 M $LiPF_6$ dissolved in a mixed solvent of ethylene carbonate (EC) and diethylcarbonate (DEC) as an electrolyte solution.

COMPARATIVE EXAMPLE 1

A pure Si thin film was deposited on a Cu current collector to a thickness of 300 Å using the same amount of Si as the total amount of Si used in sample MSA-2, thereby completing an anode thin film. A lithium secondary battery was fabricated using the anode thin film in the same manner as in Example 1.

Figure 3:
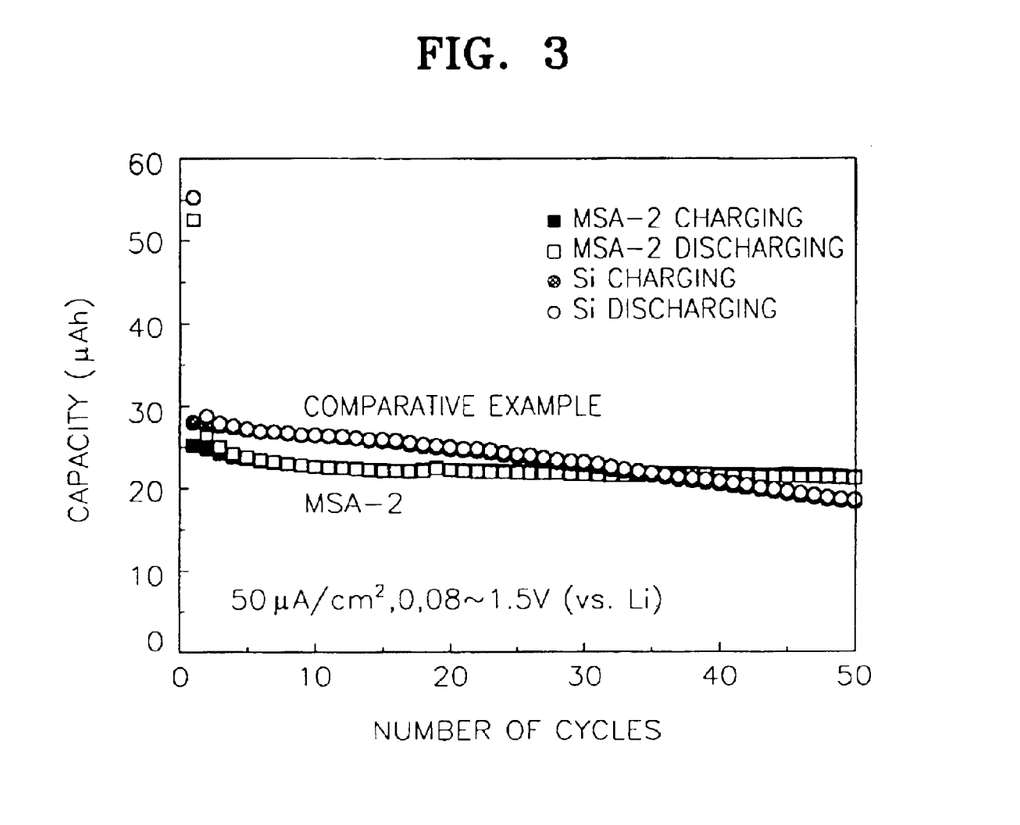
FIG. 3 is a diagram comparing cycle characteristics of lithium secondary batteries prepared by Example 1 of the present invention and Comparative Example 1.

The cycle characteristics of the lithium secondary batteries employing the anode thin film prepared by Example 1 and the anode thin film prepared by Comparative Example 1 were evaluated, and the result thereof is shown in FIG. 3. Here, the cycle characteristics were evaluated by performing more than 50 charging and discharging cycles on lithium with a current density of 50 $\mu A/cm^2$ within the range of measured potential of 0.08 to 1.5 V.

Referring to FIG. 3, the cycle characteristics of the anode active material layer of Example 1 were better than those of the Si single layer of Comparative Example 1. In particular, the anode active material layer of Example 1 showed greater than 95% of the initial capacity even after 50 cycles. As described above, the use of the Si/Ag multiple-layer thin film as an anode active material layer greatly reduces deterioration of an active material due to volumetric expansion or shrinkage of silicon, compared to the case of using the pure Si thin film (Comparative Example), leading to remarkable improvement of cycle characteristics.

Figure 4:
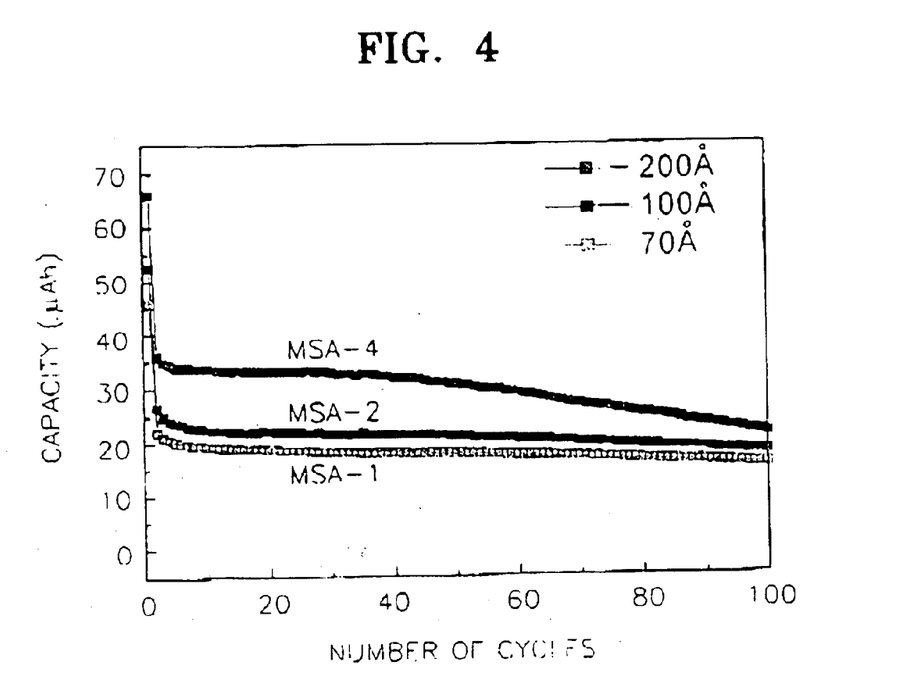
FIG. 4 is a diagram comparing cycle characteristics of anodes employing multiple-layer anode thin films having MSA-1, MSA-2 and MSA-4 structures, respectively, prepared by Example 1 of the present invention, depending on the thickness of a silicon (Si) layer.

The cycle characteristics of the lithium secondary batteries employing the multiple-layer anode thin films having MSA-1, MSA-2 and MSA-4 structures of Example 1 were evaluated, and the result thereof is shown in FIG. 4. Here, the cycle characteristics were evaluated by performing more than 100 charging and discharging cycles by a constant current method with a current density of 50 $\mu A/cm^2$ within the range of measured potential of 0.08 to 1.5 V versus Li. Referring to FIG. 4, the thinner the Si layer, the better the charging/discharging cycle characteristics. In the MSA-4 anode thin film having a 200 Å thick Si layer, a reduction in capacity was observed after approximately 50 cycles. In the MSA-1 and MSA-2 anode thin films respectively having 70 Å and 100 Å thick Si layers, little reduction in capacity occurred even after 100 charging/discharging cycles.

Referring to FIGS. 3 and 4, irreversible capacity was observed during the first cycle.

Figure 5A:
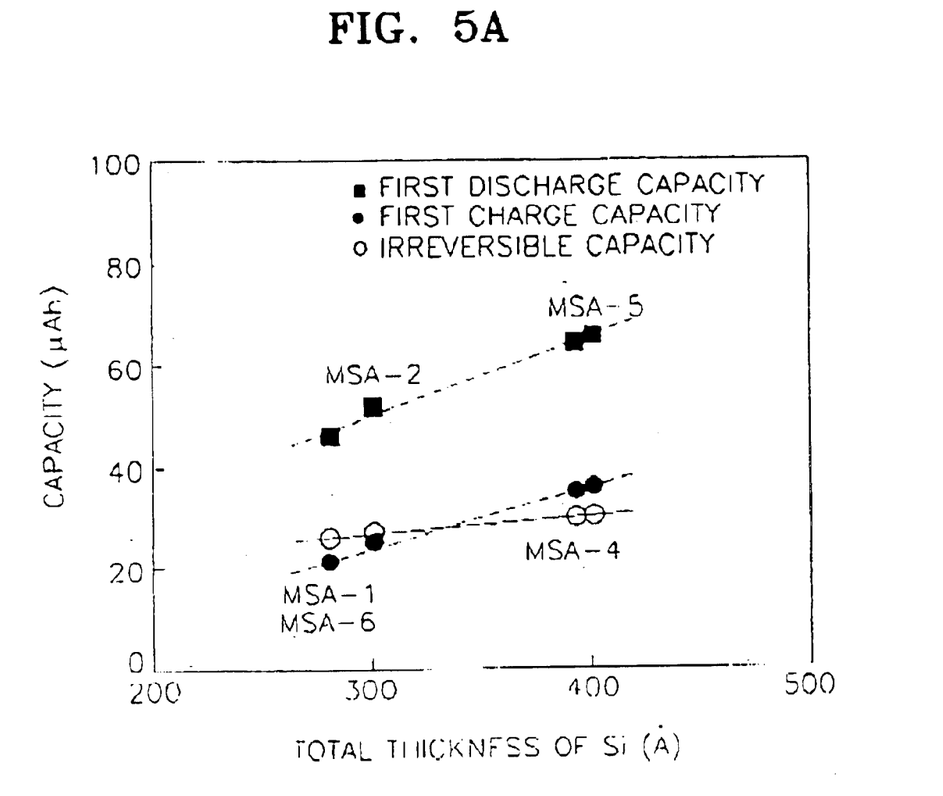
FIG. 5A is a diagram showing the charge capacity, discharge capacity and irreversible capacity of an anode employing the multiple-layer thin film prepared by Example 1 of the present invention during the first charge/discharge cycle, depending on the total thickness of a silicon (Si) layer.
Figure 5B:
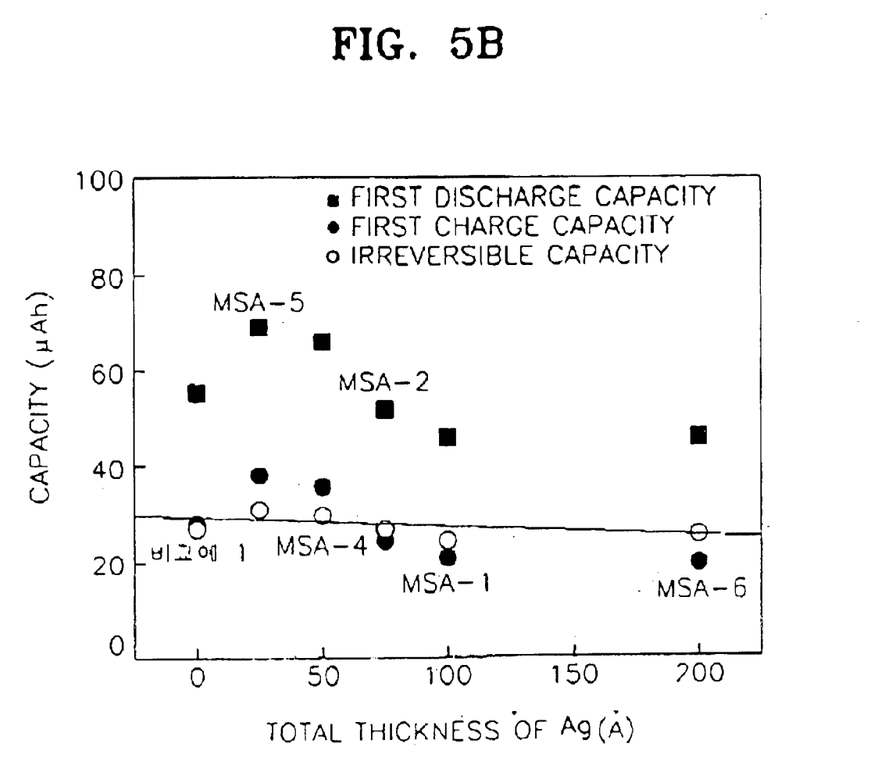
FIG. 5B is a diagram showing the charge capacity, discharge capacity and irreversible capacity of an anode employing the multiple-layer thin film prepared by Example 1 of the present invention during the first charge/discharge cycle, depending on the total thickness of a silver (Ag) layer.

In order to verify causes of such irreversible capacity, the charge capacity, discharge capacity and irreversible capacity of the lithium secondary battery employing the multiple-layer thin film of Example 1 are shown in FIGS. 5A and 5B. Here, these characteristics were evaluated under conditions in which charging and discharging were performed with a current density of 50 $\mu A/cm^2$ within the range of measured potential of 0.08 to 1.5 V.

Referring to FIGS. 5A and 5B, while the charge capacity and discharge capacity at the first cycle were proportional to the amount of a Si active material, the irreversible capacity was maintained at a constant level irrespective of the amount of Si or Ag used as an active material. This result shows that the irreversible capacity at the first cycle is presumably caused by a side reaction occurring at the interface between an electrode and a liquid electrolyte, rather than by a structural damage of the active material itself.

Figure 6:
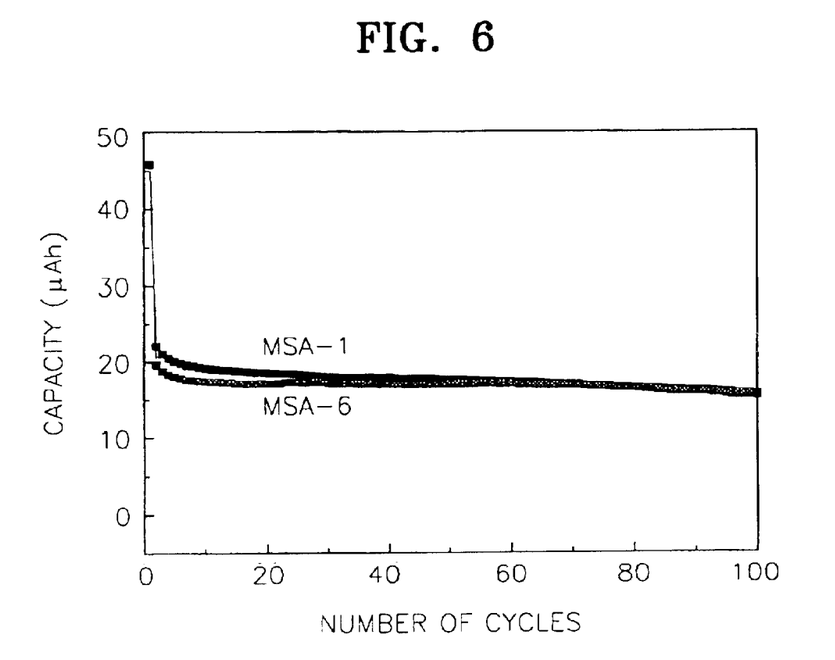
FIG. 6 is a diagram comparing cycle characteristics of anodes employing multiple-layer anode thin films having MSA-1 and MSA-6 structures, respectively, prepared by Example 1 of the present invention, depending on the thickness of a silver (Ag) layer.

In order to evaluate cycle characteristics depending on the thickness of an Ag layer of Example 1, cycle characteristics of lithium secondary batteries employing anode thin films having MSA-1 and MSA-6 structures were investigated, and the result thereof is shown in FIG. 6. Both of the lithium secondary batteries employing anode thin films having MSA-1 and MSA-6 structures exhibit excellent cycle characteristics. In particular, as the thickness of the Ag layer increased to 50 Å as in the MSA-6 structure, the capacity decreased less sharply over repeated cycles than in the MSA-1 structure in which the thickness of the Ag layer is 25 Å. Also, approximately 95% of the initial charge capacity of 18 $\mu Ah$ was maintained even after 100 cycles. Here, the cycle characteristics were evaluated by performing more than 50 charging and discharging cycles on lithium by a constant current method with a current density of 50 $\mu A/cm^2$ within the range of measured potential of 0.08 to 1.5 V.

Figure 7:
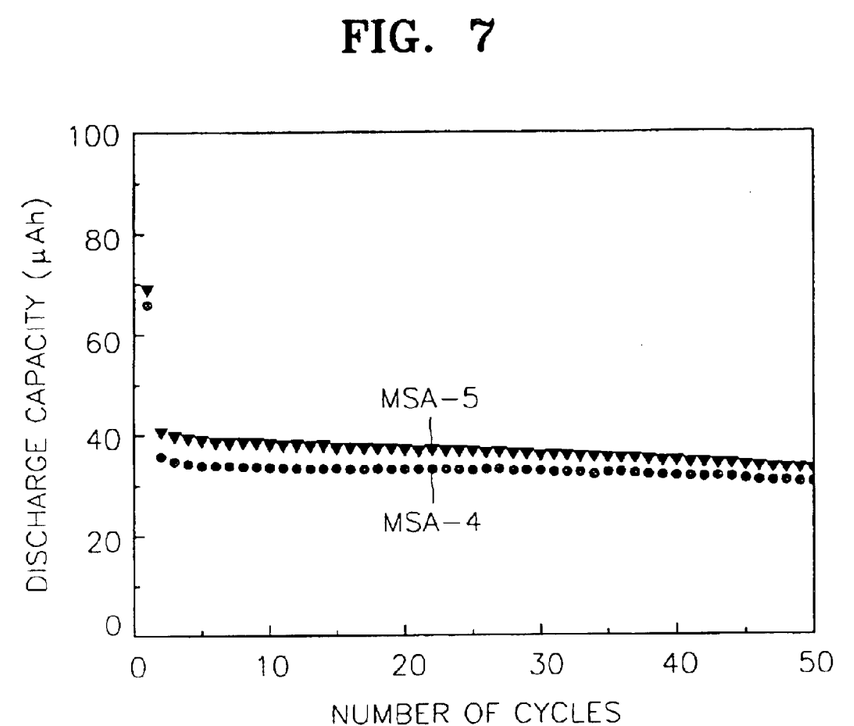
FIG. 7 is a diagram comparing cycle characteristics of anodes employing multiple-layer anode thin films having MSA-4 and MSA-5 structures, respectively, prepared by Example 1 of the present invention.

In order to compare cases where the topmost layer of an anode active material layer is an Ag layer and the topmost layer of anode active material layer is a Si layer, cycle characteristics of lithium secondary batteries employing multiple-layer thin films having MSA-4 and MSA-5 structures were measured, and the result thereof is shown in FIG. 7. Here, the cycle characteristics were evaluated by performing more than 50 charging and discharging cycles on lithium by a constant current method with a current density of 50 $\mu A/cm^2$ within the range of measured potentional of 0.08 to 1.5 V.

Referring to FIG. 7, when Si is present in the topmost layer of the anode active material layer as in the MSA-5 structure, a larger capacity was exhibited than in the case when Ag is present in the topmost layer of the anode active material layer as in the MSA-4. Also, the MSA-4 structure showed better cycle characteristics than the MSA-5 structure in which Si is exposed to an electrolyte solution. This is because the Ag layer present in the topmost layer can suppress cracking due to volumetric expansion or shrinkage of silicon and a loss of an active material at the interface between the electrolyte and electrode. This result suggests that a lithium secondary battery employing a solid electrolyte can greatly improve chemical and mechanical stability between an electrode and an electrolyte by forming an Ag layer in the topmost layer of the anode active material layer.

EXAMPLE 2

Except that Si, Ag and V targets as anode thin films were co-sputtered to deposit a Si—Ag ($Si_{0.6}Ag_{0.4}$) single layer having a stacked structure to a thickness of 900 Å, as shown in FIG. 2F, an anode thin film was fabricated in the same manner as in Example 1. Here, in order to adjust the contents of Si and Ag in the single layer, rf power applied to the Si target was fixed to 200 W and dc voltages applied to the Ag target were varied.

EXAMPLE 3

Except that a Ni target was used instead of the V target, an anode thin film was fabricated in the same manner as in Example 1.

EXAMPLE 4

Except that a Mo target was used instead of the V target, an anode thin film was fabricated in the same manner as in Example 1.

EXAMPLE 5

Except that a Cu target was used instead of the V target, an anode thin film was fabricated in the same manner as in Example 1.

EXAMPLE 6

Except that V target was not used, an anode thin film was fabricated in the same manner as in the Example 1.

Cycle characteristics of lithium secondary batteries employing anode thin films prepared by Examples 2 through 6 were measured. Here, the cycle characteristic of lithium secondary battery employing anode thin film prepared by Example 2 were evaluated by performing more than 50 charging and discharging cycles on lithium by a constant current method with a current density of 50 $\mu A/cm^2$ within the range of measured potential of 0.12 to 1.5 V.

Figure 8:
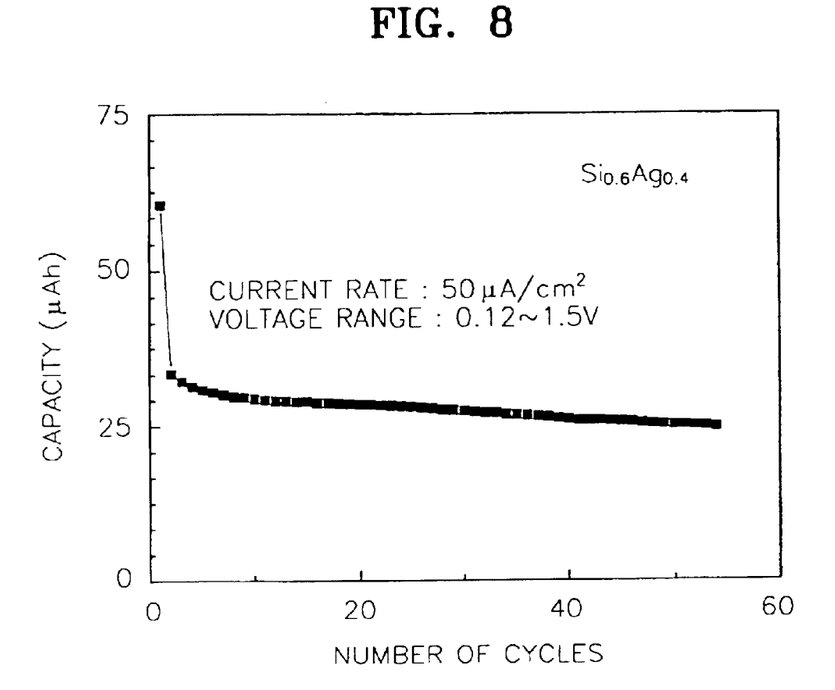
FIG. 8 is a graph showing cycle characteristics of anodes employing a silicon-silver single layer anode thin film prepared by Example 2 of the present invention.

The evaluation result showed that the cycle characteristics of the lithium secondary batteries prepared by Examples 2 through 6 were relatively good. Referring to FIG. 8 showing the case of Example 2, in particular, approximately 90% of the initial charge capacity of 32 $\mu Ah$ was maintained even after 50 cycles.

Also, the cycle characteristics of lithium secondary battery employing anode thin films prepared by Example 3 through 6 were evaluated by performing m re than 50 charging and discharging cycles on lithium by a constant current method with a current density of 50 $\mu A/cm^2$ within the range of measured potential of 0.08 to 1.5 V.

As described above, the anode thin film according to the present invention can greatly improve cycle characteristics of a lithium secondary battery by suppressing volumetric expansion or shrinkage of silicon occurring during charging and discharging. Thus, the chemical and mechanical stability of the anode thin film can be greatly improved at an interface between an electrode and an electrolyte, thereby fabricating a lithium secondary battery having improved cycle characteristic.

Although the invention has been described in detailed embodiments, it is not intended that the scope of the claims appended hereto be limited to the description as set forth herein. Accordingly, it is understood that various other modifications will be apparent to and can be readily made by those skilled in the art without departing from the scope and spirit of this invention.

What is claimed is:

1. An anode thin film for a lithium secondary battery comprising a current collector and an anode active material layer arranged above the current collector, wherein the anode active material layer is a multiple-layer thin film comprising a silicon (Si) layer and a silver (Ag) layer, further comprising a buffer layer between the current collector and the anode active material layer, the buffer layer being made of at least one selected from the group consisting of vanadium, nickel, molybdenum and copper.

2. The anode thin film of claim 1, wherein the thickness of the buffer layer is in the range of 50 to 250 Å.

3. The anode thin film of claim 1, wherein the thickness of the Si layer is in the range of 50 to 250 Å and the thickness of the Ag layer is in the range of 10 to 70 Å.

4. The anode thin film of claim 1, wherein the Si layer and the Ag layer are alternately stacked.

5. The anode thin film of claim 4, wherein the Ag layer is formed between Si layers.

6. The anode thin film of claim 1, wherein the topmost layer of the multiple-layer thin film is made of Ag.

7. The anode thin film of claim 1, wherein the silicon layer consists of silicon.

8. The anode thin film of claim 1, wherein the silver layer consists of silver.

* * * * *